United States Patent [19]

Klein

[11] 3,721,760

[45] March 20, 1973

[54] BLANKING CIRCUITRY FOR BLANKING A CATHODE RAY TUBE

[75] Inventor: Arthur Harold Klein, Oakfield, N.Y.

[73] Assignee: GTE Sylvania Incorporated, Seneca Falls, N.Y.

[22] Filed: Aug. 26, 1971

[21] Appl. No.: 175,158

[52] U.S. Cl. ............................................178/7.5 R

[51] Int. Cl. ..........................H04n 5/44, H04n 5/68

[58] Field of Search....178/5.4 R, 7.3 R, 7.5 R, 7.3 DC,

178/7.5 DC

[56] References Cited

UNITED STATES PATENTS 3,446,915 5/1969 Voige ..............................178/7.5 R 3,414,669 12/1968 Willis..............................178/5.4 R X 3,436,475 4/1969 Zimmerman et al...............178/7.5 R 3,507,994 4/1970 Kent et al. .........................178/7.5 R

*Primary Examiner*—Robert L. Richardson

*Attorney*—Norman J. O'Malley et al.

[57] ABSTRACT

A blanking circuit for blanking a cathode ray tube by cutting off the video output transistor and hence the cathode ray tube in response to a retrace pulse from an asymmetrical multivibrator is disclosed. The common electrode of the video output transistor is connected to a potential reference by a normally forward biased diode which is reverse biased by the blanking circuit during retrace intervals.

9 Claims, 1 Drawing Figure

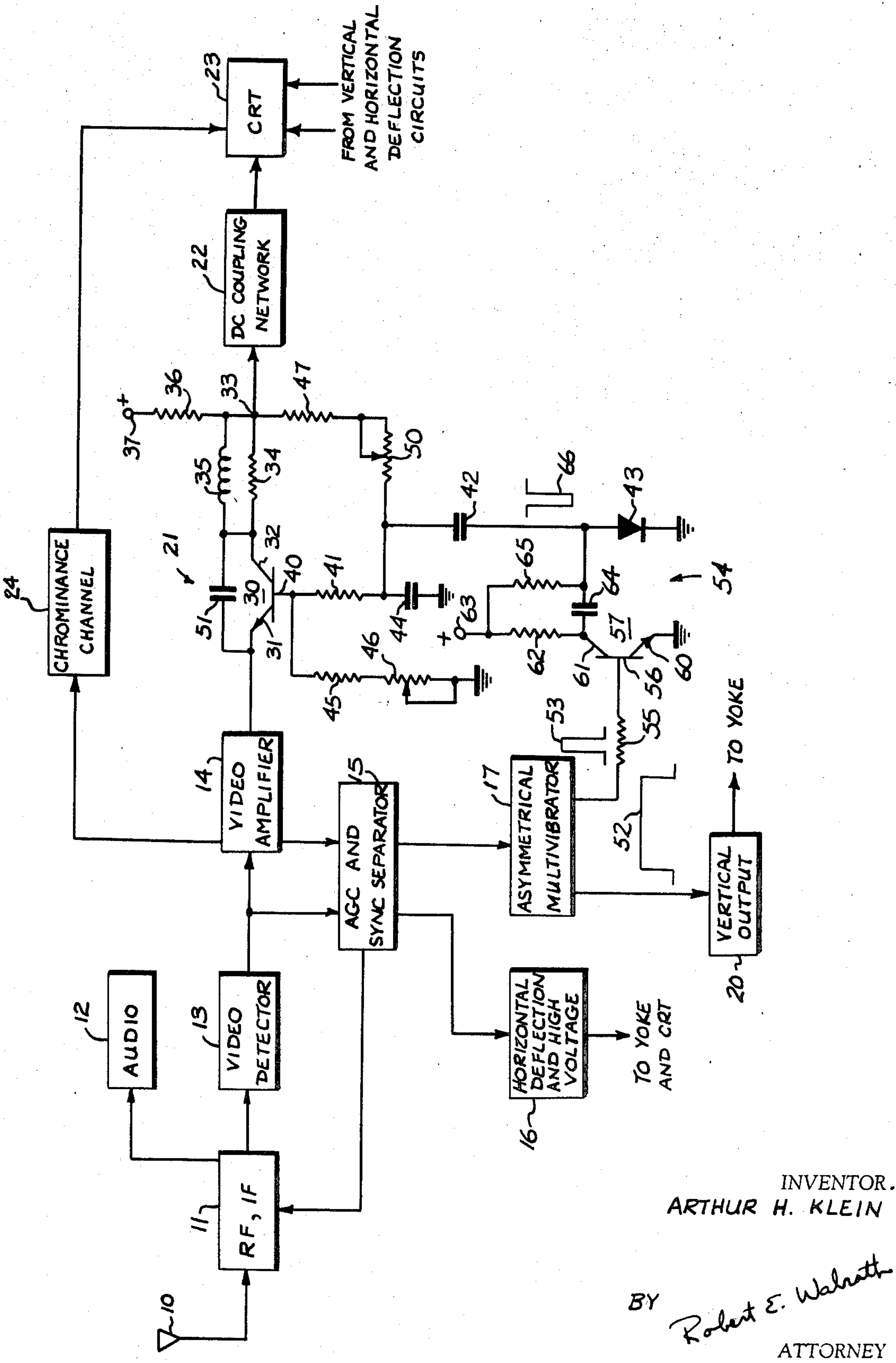
INVENTOR.
ARTHUR H. KLEIN
BY Robert E. Walrath
ATTORNEY

BLANKING CIRCUITRY FOR BLANKING A CATHODE RAY TUBE

CROSS-REFERENCE TO RELATED APPLICATION

Guillerno Elias, Silverio Antonio Valdes and George Cleveland Waybright, "Signal Generating Circuit for a Deflection System," Ser. No. 175,159, filed Aug. 26, 1971, and assigned to the same assignee as the present invention.

BACKGROUND OF THE INVENTION

This invention relates to blanking circuitry for cathode ray tubes. The composite video signal detected in television receivers includes blanking pulses which occur during the retrace intervals or periods. These blanking pulses are transmitted at "black level" so that the electron gun or guns of the cathode ray tube are turned off during the time that the deflection voltages are retracing or returning to the start of the trace intervals. Such blanking pulses are transmitted for both horizontal and vertical retrace.

Although horizontal and vertical blanking pulses are included in the received composite video signal, it has long been the practice to utilize auxiliary blanking pulses to ensure complete blanking of the cathode ray tube during retrace. Such auxiliary blanking pulses can be derived from the horizontal and vertical output transformers which develop high amplitude pulses during retrace. In transformerless deflection systems, however, such pulses are not present during retrace. Prior art attempts to provide suitable blanking circuitry for transformerless deflection systems have not been entirely satisfactory due to one or more of a variety of reasons, such as circuit complexity, cost and technical deficiencies.

OBJECTS AND SUMMARY OF THE INVENTION

It is an object of this invention to provide new and novel circuitry for blanking a cathode ray tube.

It is another object to provide novel circuitry for blanking a cathode ray tube in a television receiver utilizing a transformerless deflection system.

It is a further object to provide novel circuitry for blanking a cathode ray tube in a television receiver during vertical retrace intervals.

The above and other objects and advantages are achieved in one aspect of this invention in a television receiver having a cathode ray tube, a video amplifier, and deflection apparatus for causing electron beam scanning of the cathode ray tube. Circuitry for blanking the cathode ray tube during retrace is provided which includes a transistor having an input electrode coupled to the video amplifier and an output electrode coupled to the cathode ray tube for supplying the signal indicative of video information to the cathode ray tube. The transistor includes a common electrode coupled to a potential reference level by a unidirectional conduction device such as a diode. A blanking circuit is connected to the deflection apparatus and to the unidirectional conduction device for reverse biasing the unidirectional conduction device during retrace intervals of the electron beam scanning of the cathode ray tube.

BRIEF DESCRIPTION OF THE DRAWING

The single FIGURE is a schematic and block diagram of a television receiver including the preferred embodiment of the invention.

DETAILED DESCRIPTION OF THE INVENTION

For a better understanding of the present invention, together with other and further objects, advantages and capabilities thereof, reference is made to the following disclosure and appended claims in connection with the above-described drawing.

In the drawing typical or known components of a television receiver are shown in block diagram form. An antenna 10 is connected to an input of a block 11 which includes the usual radio frequency (RF) tuner to heterodyne the received signal to intermediate frequencies (IF) and the IF amplifier. An output of the IF amplifier is connected to an audio channel 12 which reproduces the sound from the received audio signal. Another output of the IF amplifier is connected to a video detector 13 which detects the composite video signal. An output from video detector 13 is connected to a video amplifier 14 which has one or more stages of amplification. An output of video amplifier 14 is connected to an automatic gain control (AGC) and synchronizing pulse separator circuit 15. The AGC circuit develops AGC voltages which are applied to the RF and IF sections 11 to control the gain thereof. The output of video detector 13 is connected to the usual noise gate in the AGC and synchronizing pulse separator circuit 15.

Separated synchronizing pulses are connected to horizontal deflection apparatus 16 which also includes the high voltage circuitry. The horizontal deflection and high voltage circuit 16 provides horizontal deflection voltages at the line scanning rate and the high voltages required to operate a cathode ray tube.

Separated synchronizing pulses are also coupled to vertical deflection apparatus to synchronize the field scanning of the electron beams in the cathode ray tube with the composite video signal. The vertical deflection apparatus includes an asymmetrical multivibrator 17 which is connected to receive separated synchronizing pulses from synchronizing pulse separator 15. Asymmetrical multivibrator 17 provides trace and retrace pulses at the field scanning rate to a vertical output stage 20 which is coupled to the vertical deflection windings of a yoke associated with a cathode ray tube 23.

An output of video amplifier 14 is connected to a video output stage 21 for supplying a signal indicative of video information such as the luminance signal thereto. An output of video output stage 21 is coupled by a direct current (DC) coupling network 22 to a cathode ray tube (CRT) 23. CRT 23 includes a yoke which receives deflection voltages from horizontal deflection circuit 16 and vertical output stage 20 to cause electron beam scanning of the CRT.

Another output of video amplifier 14 is connected to a chrominance channel 24 which processes the chrominance information contained in the composite video signal. The outputs from the chrominance channel are connected to CRT 23, for example, to the control grids thereof. If the invention is to be used in a monochrome television receiver, the chrominance channel is deleted.

Video output stage 21 includes a transistor 30 which has an input electrode such as emitter 31 connected to the output of video amplifier 14 to receive the luminance signal therefrom. Transistor 30 has an output electrode such as collector 32 connected to a junction 33 by a resistor 34 in parallel with an inductor 35. Junction 33 is connected by a resistor 36 to a positive voltage source illustrated as a terminal 37 and to the input of DC coupling network 22. DC coupling network 22 includes, for example, the usual drive controls.

Transistor 30 further has a common electrode such as base 40 connected by a resistor 41 in series with a capacitor 42 and a unidirectional conduction device such as diode 43 to a potential reference level illustrated as chassis ground. The junction between resistor 41 and capacitor 42 is connected to chassis ground by a small capacitor 44. Base 40 is further connected by a resistor 45 in series with a potentiometer 46 to chassis ground. Potentiometer 46 serves as a brightness control by varying the bias at base 40. Junction 33 is connected by a resistor 47 in series with a potentiometer 50 to the junction between resistor 41 and capacitor 42. Potentiometer 50 serves as a brightness range control. A small feedback capacitor 51 is connected between collector 32 and emitter 31 of transistor 30.

Asymmetrical multivibrator 17 is preferably astable and provides a pulse during trace intervals when it is in one state and a much shorter pulse during retrace intervals when it is in its other state. The pulse during trace intervals is illustrated by pulse 52 and the pulse during retrace intervals is illustrated by pulse 53. Pulse 52 is preferably waveshaped so that vertical output stage 20 provides a suitable deflection voltage to the vertical deflection windings of the yoke. Suitable circuitry for multivibrator 17 and vertical output stage 20 is illustrated in the above-referenced copending application of Elias et al.

Multivibrator 17 is connected by a blanking circuit 54 to diode 43. Blanking circuit 54 includes a resistor 55 connected between the output of multivibrator 17 and an input electrode such as base 56 of transistor 57. A common electrode such as emitter 60 of transistor 57 is connected to chassis ground while an output electrode such as collector 61 is connected by a resistor 62 to a positive voltage source illustrated as a terminal 63. Collector 61 is further connected by a capacitor 64 to the junction between capacitor 42 and diode 43. Source 63 is connected by a resistor 65 to the junction between capacitor 42 and diode 43.

In operation, transistor 30 of video output stage 21 couples signals indicative of luminance information from video amplifier 14 to DC coupling network 22 and hence to CRT 23. The luminance signal may be applied to the cathodes of the electron guns of CRT 23 in a color television receiver. Transistor 30 is biased as a common base amplifier with source 37 providing the bias potential. Resistor 41 is accordingly preferably small. Multivibrator 17 provides an output voltage to transistor 57 of blanking circuit 54 that turns transistor 57 to a nonconducting condition or OFF during trace intervals. Capacitor 64 charges through resistor 62 and diode 43 to a voltage approximately equal to the voltage of source 63. Current flow through resistor 65 forward biases diode 43 thereby connecting capacitor 42 to ground through forward biased diode 43. Capacitor 42 is sufficiently large to by-pass AC signal frequencies to ground and thus acts as an AC by-pass capacitor for base 40 of transistor 30. Capacitor 44 is preferably small relative to capacitor 42.

During each vertical retrace interval, multivibrator 17 provides a pulse such as pulse 53 which in the disclosed embodiment of the invention is a positive pulse. Pulse 53 switches transistor 57 to a conducting condition or ON thereby lowering the voltage of collector 61 to substantially ground potential. Capacitor 64 provides a negative-going pulse 66 that reverse biases diode 43 and is coupled through capacitor 42 and resistor 41 to base 40 of transistor 30 to cut-off transistor 30. When transistor 30 is cut-off, luminance signals are blocked and the collector voltage of collector 32 rises. Thus, the voltage at junction 33 rises toward the voltage of source 37. This increasing voltage is coupled through DC coupling network 22 to the electrodes of CRT 23 to cut-off the electron gun or guns in CRT 23 thereby providing blanking during the vertical retrace interval. When the next trace interval begins, pulse 53 ends and transistor 57 is turned OFF to forward bias diode 43 and permit transistor 30 to pass luminance signals.

Thus, there has been illustrated and described one embodiment of the invention that achieves the objects and advantages noted above. Specifically, circuitry for blanking a cathode ray tube during retrace has been provided which is simple, inexpensive, and reliable. Furthermore, the circuitry does not depend upon high amplitude pulses developed across a transformer for operation.

Although the invention has been described with reference to blanking the video output stage in the luminance channel during vertical retrace, it will be evident to those skilled in the art that the invention has utility in other signal channels as well. For example, in a color television receiver the luminance signal may be matrixed with the color difference signals to provide red, green, and blue video signals for application to the cathode ray tube. In such systems it may be desired to use the invention to blank the video signals after the matrixing operation. Also, the invention can be utilized to provide blanking during horizontal retrace as well as during vertical retrace, and the stage that is blanked can be before the last active stage in the channel. In other words, DC coupling network 22 can include active components, if desired.

While there has been shown and described what is at present considered the preferred embodiment of the invention, it will be obvious to those skilled in the art that various changes and modifications may be made therein without departing from the scope of the invention as defined by the appended claims.

What is claimed is:

1. In a television receiver having a cathode ray tube, a video amplifier for supplying a signal indicative of video information, and deflection apparatus for causing electron beam scanning of said cathode ray tube, circuitry for blanking said cathode ray tube during retrace comprising: a unidirectional conduction device;

a first transistor having an input electrode coupled to said video amplifier, an output electrode coupled to said cathode ray tube for supplying a signal indicative of said video information to said cathode ray tube, and a common electrode coupled to a potential reference level by said unidirectional conduction device; and a second transistor having an input electrode connected to said deflection apparatus and an output electrode connected to said unidirectional conduction device for reverse biasing said unidirectional conduction device during retrace intervals of the electron beam scanning of said cathode ray tube.

2. Circuitry as defined in claim 1 wherein said unidirectional conduction device is a diode and an AC by-pass capacitor is connected between said common electrode and said diode.

3. Circuitry as defined in claim 2 wherein said common electrode is the base of said first transistor.

4. In a television receiver having a cathode ray tube, a video amplifier, and vertical deflection apparatus for causing vertical electron beam scanning of said cathode ray tube, circuitry for blanking said cathode ray tube during vertical retrace comprising:

a unidirectional conduction device;

a transistor having an input electrode coupled to said video amplifier, an output electrode direct current coupled to said cathode ray tube for supplying a signal indicative of video information thereto, and a common electrode coupled to a potential reference level by said unidirectional conduction device; and a transistor blanking circuit having an input connected to said vertical deflection apparatus and an output connected to said unidirectional conduction device for reverse biasing said unidirectional conduction device during retrace intervals of the vertical electron beam scanning of said cathode ray tube.

5. Circuitry as defined in claim 4 wherein said unidirectional conduction device is a diode.

6. Circuitry as defined in claim 5 wherein an AC by-pass capacitor is connected between said common electrode and said diode, and the output of said transistor blanking circuit is connected to a junction between said capacitor and said diode.

7. Circuitry as defined in claim 5 wherein said common electrode is the base of said transistor.

8. Circuitry as defined in claim 5 wherein said transistor blanking circuit includes a second transistor, said vertical deflection apparatus includes an asymmetrical multivibrator having an output connected to the base of said transistor, and the output of said transistor blanking circuit includes a capacitor connected between the collector of said second transistor and a junction between said common electrode of said first transistor and said diode.

9. Circuitry as defined in claim 5 wherein said transistor blanking circuit includes means for forward biasing said diode during vertical trace intervals of the electron beam scanning of said cathode ray tube.

* * * * *